(12) United States Patent
Voell et al.

(10) Patent No.: US 10,749,848 B2
(45) Date of Patent: Aug. 18, 2020

(54) SYSTEMS AND METHODS FOR PROVIDING DATA PRIVACY IN A PRIVATE DISTRIBUTED LEDGER

(71) Applicant: JPMorgan Chase Bank, N.A., New York, NY (US)

(72) Inventors: David Voell, Little Silver, NJ (US); Samer Falah, Staten Island, NY (US); Patrick Mylund Nielsen, Brooklyn, NY (US); Felix Shnir, Staten Island, NY (US); Chetan Sarva, Rego Park, NY (US); Gene D. Fernandez, Holmdel, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 454 days.

(21) Appl. No.: 15/475,846

(22) Filed: Mar. 31, 2017

(65) Prior Publication Data
US 2017/0289111 A1 Oct. 5, 2017

Related U.S. Application Data

(60) Provisional application No. 62/316,841, filed on Apr. 1, 2016.

(51) Int. Cl.
*H04L 9/14* (2006.01)
*H04L 29/06* (2006.01)
(Continued)

(52) U.S. Cl.
CPC ........ *H04L 63/0435* (2013.01); *H04L 9/0825* (2013.01); *H04L 9/14* (2013.01);
(Continued)

(58) Field of Classification Search
CPC .. H04L 63/0435; H04L 63/061; H04L 9/3236
(Continued)

(56) References Cited

U.S. PATENT DOCUMENTS 6,996,251 B2 * 2/2006 Malone .............. H04N 1/32101
382/100
7,213,061 B1 * 5/2007 Hite .................... H04L 12/2803
361/803
(Continued)

FOREIGN PATENT DOCUMENTS

WO 2017109140 † 6/2017

OTHER PUBLICATIONS

PCT Internatonal Search Report and Written Opinion, International Application No. PCT/US2017/025377, dated Jun. 21, 2017, pp. 1-7.
(Continued)

*Primary Examiner* — Farid Homayounmehr
*Assistant Examiner* — Thanh T Le
(74) *Attorney, Agent, or Firm* — Greenberg Traurig LLP

(57) ABSTRACT

Systems and methods for providing data privacy in a private distributed ledger are disclosed. According to another embodiment a distributed ledger network may include a first node comprising a first node computer processor and hosting a central ledger comprising a plurality of entries for public transactions and private transactions, wherein the entries for public transactions comprise transaction payloads for the respective public transaction, and the entries for private transactions comprise a cryptographic hash digest of a transaction payload for the respective private transaction; and a plurality of second nodes each comprising a second node computer processor and hosting a public database comprising the public transactions, and a private database comprising transaction payloads for the private transactions to which the node is a party.

11 Claims, 10 Drawing Sheets

(51) Int. Cl.
  *H04L 9/32* (2006.01)
  *H04L 9/08* (2006.01)
(52) U.S. Cl.
  CPC .......... *H04L 9/3236* (2013.01); *H04L 9/3239* (2013.01); *H04L 9/3247* (2013.01); *H04L 63/045* (2013.01); *H04L 63/0428* (2013.01); *H04L 63/061* (2013.01); *H04L 63/123* (2013.01); *H04L 2209/38* (2013.01); *H04L 2209/56* (2013.01)
(58) Field of Classification Search
  USPC ........................................................ 713/171
  See application file for complete search history.

(56) References Cited

U.S. PATENT DOCUMENTS

| | | | | |
|---|---|---|---|---|
| 8,417,954 | B1* | 4/2013 | Sagal | H04L 9/3263 713/176 |
| 9,305,181 | B1† | 4/2016 | Watson | |
| 2002/0112160 | A2* | 8/2002 | Wheeler | G06Q 20/00 713/170 |
| 2004/0109569 | A1* | 6/2004 | Ellison | G11B 20/00086 380/277 |
| 2007/0199075 | A1* | 8/2007 | Skoric | H04L 9/3268 726/27 |
| 2009/0094673 | A1* | 4/2009 | Seguin | G06F 21/51 726/1 |
| 2009/0327714 | A1† | 12/2009 | Yaghmour | |
| 2010/0268938 | A1* | 10/2010 | Resch | H04L 9/0897 713/153 |
| 2012/0159175 | A1* | 6/2012 | Yocom-Piatt | G06F 11/1453 713/176 |
| 2013/0091550 | A1* | 4/2013 | Joyce | G06F 21/00 726/4 |
| 2014/0122866 | A1* | 5/2014 | Haeger | H04L 63/061 713/153 |
| 2014/0317403 | A1* | 10/2014 | Resch | G06F 11/1044 713/160 |
| 2015/0206106 | A1 | 7/2015 | Yago | |
| 2015/0332283 | A1 | 11/2015 | Witchey | |
| 2015/0371224 | A1 | 12/2015 | Lingappa | |
| 2015/0379510 | A1 | 12/2015 | Smith | |
| 2016/0070889 | A1* | 3/2016 | Hendricks | G06F 21/10 713/150 |
| 2016/0077977 | A1* | 3/2016 | Narayanamurthy | G06F 21/64 713/193 |
| 2016/0149867 | A1* | 5/2016 | Lohr | H04B 10/85 380/256 |
| 2017/0005803 | A1* | 1/2017 | Brownewell | H04L 63/0428 |
| 2017/0048217 | A1* | 2/2017 | Biggs | H04L 9/0833 |
| 2017/0132626 | A1* | 5/2017 | Kennedy | G06Q 20/065 |
| 2017/0155515 | A1* | 6/2017 | Androulaki | G06F 21/64 |
| 2017/0230375 | A1* | 8/2017 | Kurian | H04L 63/102 |
| 2017/0250816 | A1* | 8/2017 | Popa | H04L 9/3247 |
| 2018/0025167 | A1* | 1/2018 | Bohli | G06F 21/6218 713/193 |
| 2018/0343114 | A1* | 11/2018 | Ben-Ari | H04L 9/0825 |
| 2019/0050856 | A1* | 2/2019 | Vintila | H04L 9/3239 |
| 2019/0273738 | A1* | 9/2019 | Brickell | H04L 9/3278 |

OTHER PUBLICATIONS

European Search Report, dated Nov. 18, 2019, from corresponding European Patent Application No. 17776777.9.
Zyskind; Guy et al., "Enigma: Decentralized Computation Platform with Guaranteed Privacy", ARXIV.ORG, Cornell University Library, 201 OLIN Library Cornell University Ithaca, NY 14853, Jun. 10, 2015.
Google, "Hyperledger Whitepaper", Feb. 17, 2016.
Github, "Quorum Whitepaper", Nov. 22, 2016.
Anonymous, "White Paper—A Next-Generation Smart Contract and Decentralized Application Platform", Jun. 11, 2015.

* cited by examiner
† cited by third party

SYSTEMS AND METHODS FOR PROVIDING DATA PRIVACY IN A PRIVATE DISTRIBUTED LEDGER

RELATED APPLICATIONS

This application claims priority to U.S. Provisional Patent Application Ser. No. 62/316,841 filed Apr. 1, 2016, the disclosure of which is hereby incorporated by reference in its entirety.

BACKGROUND OF THE INVENTION

1. Field of the Invention

The present invention generally relates to systems and methods for providing data privacy in a private distributed ledger.

2. Description of the Related Art

Bitcoin, blockchain, and the concept of a "distributed ledger" have penetrated the financial industry's zeitgeist as large banks seek to leverage the notion popularized by Bitcoin of a cryptographically-verified ledger where trust is not provided by a central authority but is instead established by the dissemination of identical copies of the same ledger with cryptographic proof of its correctness. Bitcoin also includes a form of Byzantine Agreement by which malicious actors cannot defraud other participants due to the use of proof-of-work under which a computational lower-bound on generating "blocks" containing transactions makes it difficult to "speed ahead" of other participants with fraudulently-altered data.

SUMMARY OF THE INVENTION

Systems and methods for providing data privacy in a private distributed ledger are disclosed. According to one embodiment, a method may include (1) a distributed application preparing a transaction payload for a transaction; (2) the distributed application sending a payload storage message comprising a hash digest, an encrypted payload, and an encrypted symmetric key to a transaction key manager; (3) the transaction key manager storing the hash digest and the encrypted payload; (4) the distributed application sending a pending transaction including the hash digest to a first node in a plurality of nodes; and (5) the first node proposing a block comprising the pending transaction to the other nodes.

In one embodiment, the step of preparing a transaction request may include generating the symmetric key; encrypting the payload with the symmetric key; calculating the hash digest of the encrypted payload; and encrypting the symmetric key with public keys of parties to the transaction.

In one embodiment, the method may further include each node validating the pending transaction in the block.

In one embodiment, the step of validating the pending transaction in the block may include identifying the pending transaction as a private transaction.

In one embodiment, wherein the pending transaction may be identified as private by a flag in a body of the pending transaction, such as a sentinel byte.

In one embodiment, the method may further include the node sending a transaction payload request message to a transaction key manager associated with the node.

In one embodiment, the transaction payload request message comprises the node's public key, the hash digest, and the node's signature.

In one embodiment, the method may further include the transaction key manager returning the encrypted payload and encrypted symmetric key to the node in response to the node being a party to the transaction.

In one embodiment, the method may further include the transaction key manager returning an indication to the node that the transaction is private in response to the node not being a party to the transaction.

According to another embodiment a distributed ledger network may include a first node comprising a first node computer processor and hosting a central ledger comprising a plurality of entries for public transactions and private transactions, wherein the entries for public transactions comprise transaction payloads for the respective public transaction, and the entries for private transactions comprise a cryptographic hash digest of a transaction payload for the respective private transaction; and a plurality of second nodes each comprising a second node computer processor and hosting a second ledger comprising the public transactions and private transaction hash digests for transactions to which the node is not a party, and a private database comprising the private state derived from private transactions to which the node is a party.

In one embodiment, each second node may further include a transaction key manager that stores transaction payloads that are private to the respective nodes.

In one embodiment, the public databases for each second node are identical.

According to another embodiment, a method for providing data privacy in a private distributed ledger may include (1) a node in a distributed ledger network receiving a block comprising a first transaction and a second transaction; (2) a node computer processor determining that the first transaction is a private transaction; (3) the node computer processor executing contract code associated with the first transaction; (4) the node computer processor determining that the node is not a party to the second transaction; and (5) the node skipping executing of contract code associated with the second transaction.

In one embodiment, wherein the node computer processor may determine that the first transaction or second transaction is a private transaction based on a bit in a data element or flag for the first or second transaction.

In one embodiment, the method may further include the node computer processor communicating a node public key and the transaction hash digest for the first transaction to a transaction key manager for the node; and the node computer processor receiving an encrypted transaction payload for the first transaction and decrypting the encrypted transaction payload, the transaction payload comprising the contract code associated with the first transaction in response to the node being a party to the first transaction.

In one embodiment, the method may further include the node computer processor communicating a node private key and the transaction hash digest for the first transaction to a transaction key manager for the node; and the node computer processor receiving an indication that the node is not a party to the first transaction in response to the node not being a party to the first transaction.

In one embodiment, the method may further include the node computer processor validating the block.

In one embodiment, the step of validating the block may include validation of the public state, wherein each node has a different private state.

In one embodiment, the distributed ledger may include private transactions and public transactions, and the private transactions and the public transactions are visible and cryptographically immutable.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Various embodiments of the present invention and their advantages may be understood by referring to FIGS. 1-8.

In general, applications built on a replicated, distributed ledger improve efficiency and lower costs compared with existing systems that are based on duplicated business logic and consensus by reconciliation. Existing systems on replicated shared ledgers are, however, unable to provide data privacy as transactions are exposed in the clear on the replicated shared ledger. This is true for systems build on distributed ledgers with and without support for smart contracts.

Embodiments disclosed herein may be directed to a private/permissioned, replicated, shared ledger that may be based on a blockchain-based distributed computing platform that provides data privacy. An example of such a distributed computing platform is the Ethereum Virtual Machine ("EVM"). Any suitable distributed computing platform may be used as is necessary and/or desired. In embodiments, data privacy may be achieved using a "private" transaction type.

In one embodiment, the distributed ledger may support smart contracts.

In one embodiment, data encryption may be used to prevent others than parties to a transaction from seeing sensitive data. Examples of such sensitive data may include account numbers, financial instruments, prices, quantities, personally identifiable information (PII), etc. The data encryption may involve a single shared blockchain and a combination of smart contract software architecture and modifications to a distributed ledger, such as an Ethereum-derived private replicated ledger. In one embodiment, the smart contract architecture may provide segmentation of private data.

Embodiments may include modifications to the block proposal and validation processes. In one embodiment, the block validation process may be modified so that all nodes validate public transactions and any private transactions that they are party to by processing or executing the contract code associated with the transactions. In another embodiment, a node may skip the processing of a transaction or the execution of contract code. In the case of distributed ledgers supporting smart contacts, this may result in a segmentation of the smart contract state database, i.e., the state database for a node may maintain only the public state (persistent storage) and private state of contracts relevant to that node.

Even though the client node state database may no longer store the state of the entire distributed ledger, the actual distributed blockchain and all the transactions therein are fully replicated across all nodes and cryptographically secured for immutability. This is an important distinction relative to other segmentation strategies based on multiple block chains and adds to the security and resiliency of the design.

In one embodiment, nodes may be permissioned to join the private network via, for example, an access control list managed by smart contract.

Figure 1:
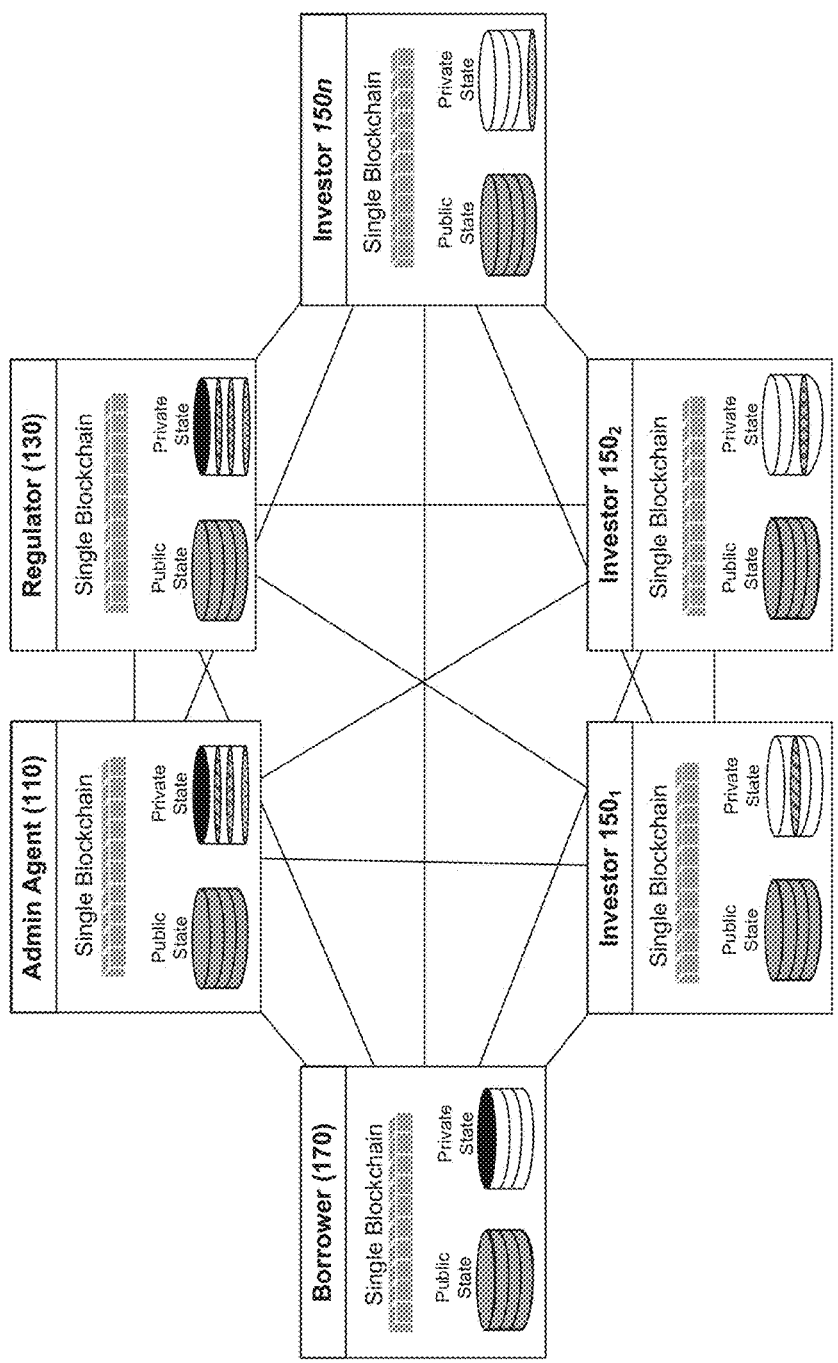
FIG. 1 depicts a system for providing data privacy in a private distributed ledger according to one embodiment.

FIG. 1 depicts a system for providing data privacy in a distributed ledger supporting smart contacts according to one embodiment. System 100 may include nodes such as administrative (admin) agent 110, regulator 130, investors $150_1, 150_2, \ldots 150_n$, and borrower 150. For example, admin agent 110 may be a party to all (private) transactions as it is responsible for loan administration. Regulator 130 may also be a party to all (private) transactions as it is responsible for enforcing regulations. Borrower 150 may be the entity that initiated the loan, and may be party to all transactions involving loans involving borrower 150, but not other loans. Investors $150_1, 150_2, \ldots 150_n$ provide funds to borrower 150 through (private) transactions with borrower 150, admin agent 110, and regulator 130. Investors $150_1, 150_2, \ldots 150_n$ may not process the private transactions involving other Investors $150_1, 150_2, \ldots 150_n$.

In one embodiment, administrative agent 110 and regulator 130 may maintain a full copy of distributed ledger 115, and each may maintain a full state database 125. The full copy of the distributed ledger may contain transactions with encrypted or unencrypted (e.g., hash digest) payloads. Investors $150_1, 150_2, \ldots 150_n$, and borrower 170 may also maintain a full copy of distributed leger 115 (which may contain encrypted or unencrypted (e.g., hash digest) transactions), but may maintain unique private state databases 155 and 175, respectively, for the node. Thus, investors $150_1, 150_2, \ldots 150_n$, and borrower 170 may only have access to state information that is relevant to them (e.g., if they are a party to a transaction).

Figure 2A:
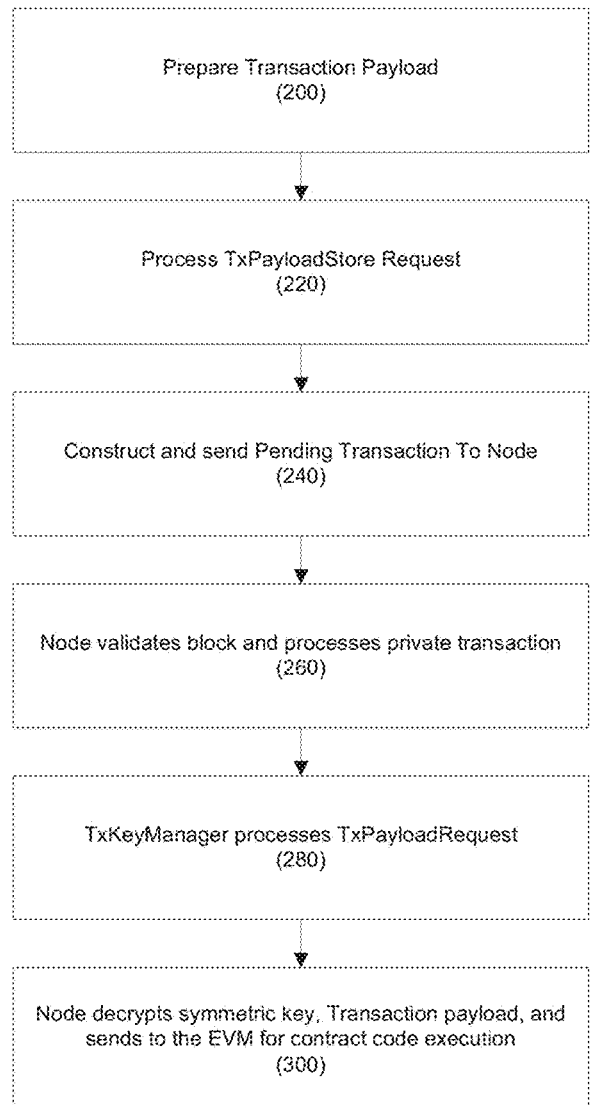
FIGS. 2A-2C depict a method for providing data privacy in a private distributed ledger according to one embodiment.
Figure 2B:
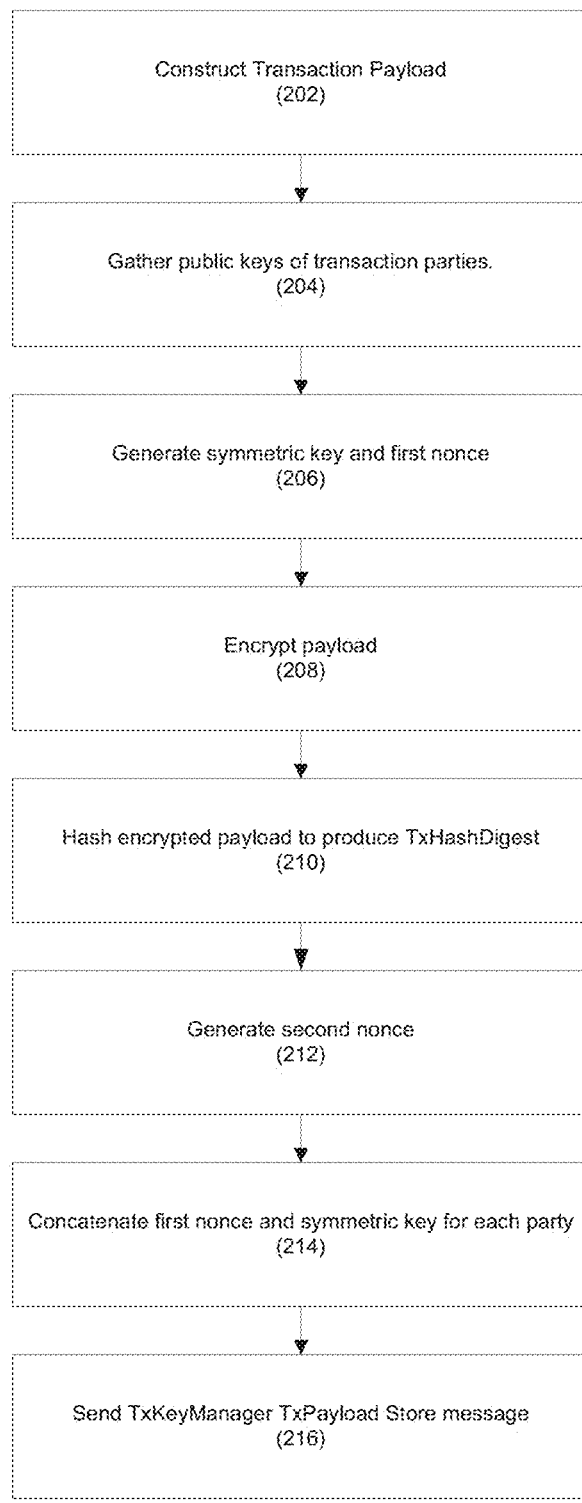
Figure 2C:
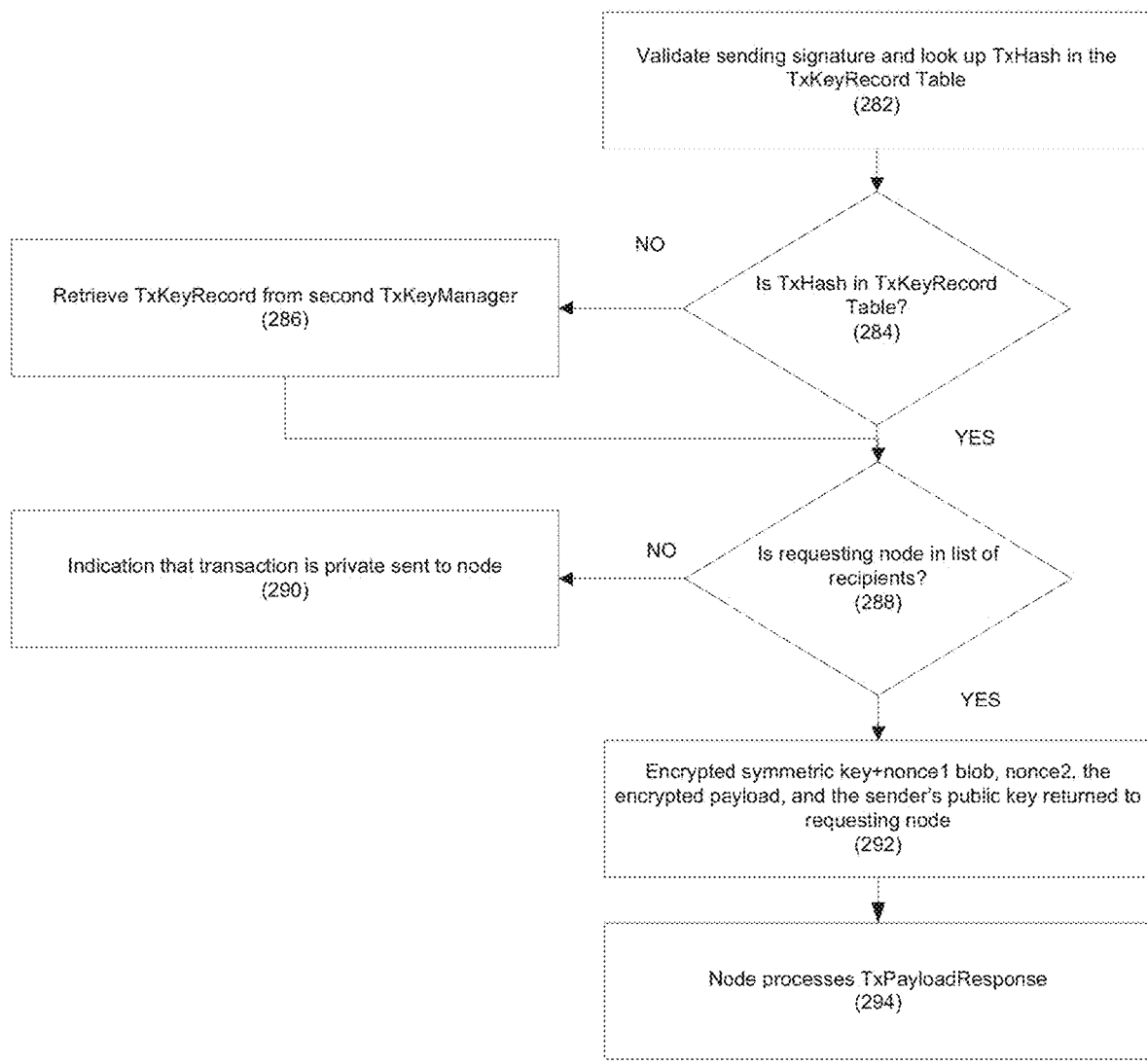
Figure 3:
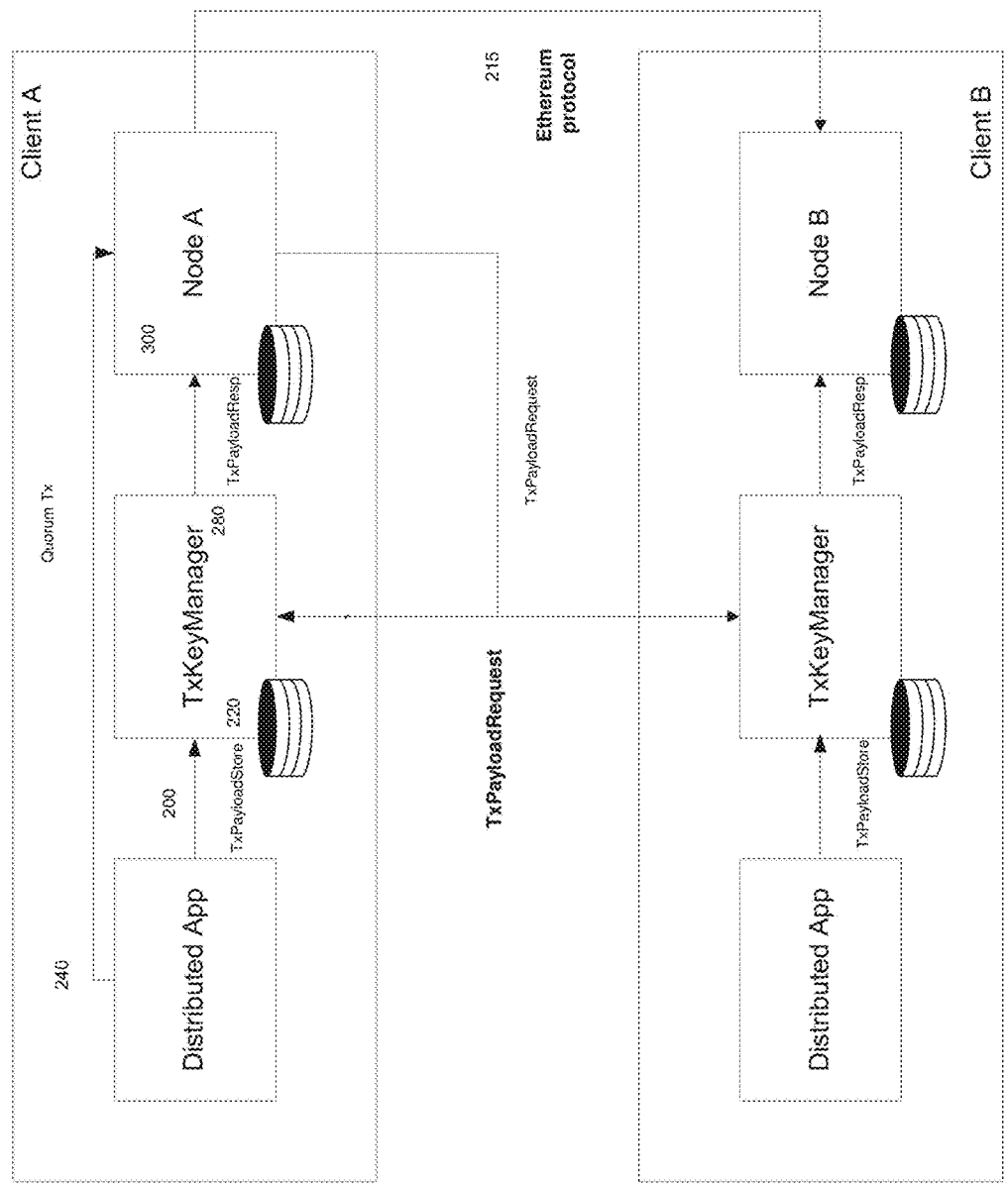
FIG. 3 depicts a block diagram implementation of the method of FIGS. 2A-2C.

Referring to FIGS. 2A-2C, a method for providing data privacy in a private distributed ledger is disclosed according to one embodiment. A block diagram is also provided as FIG. 3. Certain jurisdictions such as Luxemburg have very strict data privacy requirements such that even strongly encrypted client data is not allowed to leave their borders. Embodiment disclosed herein accommodate these stricter data privacy requirements by substituting the encrypted payload of a transaction with a hash digest of the transaction payload. The actual transaction payload may be stored (off-chain) in a local database managed by a transaction and key management service (e.g., TxKeyManager).

In one embodiment, a transaction may have a plurality of arguments or fields, including, for example, the from_address, to_address, and payload fields. The names of these arguments or fields may vary. The payload generally contains information such as the arguments to a smart contract function or a simple data structure in the case of no smart contracts. The payload may be, for example, an encrypted blob, a hash digest (e.g., 256 or 512 bit). The hash digest may be a reference to the actual payload that may be stored in the TxKeyManager, and when presented with the actual payload, the user can cryptographically prove that the payload data they received (e.g., from the TxKeyManager) matches the hash digest.

In step 200, a distributed application may prepare a transaction ("Tx") payload. In one embodiment, this may involve generating a symmetric key, encrypting the payload with the symmetric key, calculating the hash digest of the encrypted payload, encrypting the symmetric key with the public keys of the parties to the transaction, and sending a TxPayloadStore message including, for example, the hash digests, the encrypted payload, and the encrypted symmetric key to the TxKeyManager for storage.

In one embodiment, this may be performed by a transaction key manager (TxKeyManager). When the counterparty nodes process the private transaction, they use their private keys to decrypt the symmetric key, then use the symmetric key to decrypt the payload and process the transaction as normal.

FIG. 2B depicts an exemplary process of preparing a transaction payload. For example, in step 202, the transaction payload may be constructed as described above. In step 204, the public keys of transaction parties (e.g., Party, Counterparty, Custodian, and/or Regulator) may be gathered or collected. In step 206, a symmetric key and a first nonce (nonce1) may be generated. In one embodiment, the symmetric key and/or nonce1 may be randomly generated. In step 208, the payload may be encrypted with the symmetric key and nonce1. In step 210, the encrypted payload may be hashed resulting in a TxHashDigest. In step 212, a second nonce (nonce2) may be generated. In one embodiment, nonce2 may be randomly generated. In step 214, nonce1 and the symmetric key may be concatenated and may be encrypted, for each party, with the party's respective public key and nonce2. In step 216, TxKeyManager a TxPayloadStore may be sent a message containing the TxHashDigest, encrypted payload, encrypted symmetric key+nonce blobs, recipient public keys and nonce2.

Referring again to FIG. 2A, in step 220, TxKeyManager may receive and process the TxPayloadStore request. This may include, for example, validating the sending signature (e.g., the sender's signature that provides cryptographic proof that the transaction was not forged, or at least is was generated by whomever has control of the private key associated with the (from address) of the transaction) and storing the TxKeyRecord. In one embodiment, TxKeyRecord may include, for example, the transaction hash digest, the public keys of the recipients (each with an encrypted symmetric key+nonce1), the recipient nonce (nonce2), the encrypted TxPayload, and the public key of sender.

In step 240, the distributed app may construct and send the "pending" transaction (with payload hash digest) to one of the nodes. For example, all blockchain transactions begin in the pending state. A node that wishes to have a transaction added to the (one and only) blockchain of transactions first sends the "pending" transaction to the nodes in the blockchain or distributed ledger network. One of the nodes creates a new block out of the pool of pending transactions and distributes this new proposed block to the rest of the nodes in the network to validate. If the proposed block is considered to be a valid block it is permanently added to the blockchain.

In step 260, each node may receive a block for validation, and may begin validating the transactions in the block. When the node encounters a private transaction, which may be indicated, for example, by a sentinel byte, which may be a data field in the transaction that identifies the transaction as a private (as opposed to a public) transaction, the node may, for example, take typical actions, such as validating signatures, etc., and may also send a TxPayloadRequest message passing its public key, TxHash, and signature to the TxKeyManager. For example, the node may identify itself to the TxKeyManager by passing its public key to the TxKeyManager. It may also digitally sign the message so that the TxKeyManager can prove that the request message was indeed sent by node that controls the private key (corresponding to the public key).

In step 280, TxKeyManager may receive and process the TxPayloadRequest. In general, it may validate the signature, look up the TxHash, and, if the requester is party to the transaction, return the encrypted payload and encrypted symmetric key.

An exemplary implementation is provided in FIG. 2C. In step 282, the TxKeyManager may validate the sending signature, and look up the TxHash in the TxKeyRecord table. If, in step 284, the TxHash is not found in the TxKeyRecord table, in step 286, the TxKeyManager may retrieve the TxKeyRecord from a second TxKeyManager. In step 288, if the requesting node (which may be identified by the public key) is in the list of recipients (i.e., it is a party to the transaction), in step 292, the encrypted symmetric key+nonce1 blob, nonce2, the encrypted payload, and the sender's public key may be returned to the requesting node. If not (i.e., it is not a party to the transaction), in step 290, the requesting node may be returned an indication that the transaction is private. In one embodiment, the TxKeyManager may inform the requesting node that the transaction is private, and it is not a party to it. In step 294, the node may then processes the TxPayloadResponse, which may include decrypting the Symmetric Key and nonce1 (with, for example, the private key, nonce2, and public key of sender. The node may also decrypt the transaction payload with, for example, the symmetric key and nonce1.

Referring again to FIG. 2A, in step 300, the node may decrypt the symmetric key, the transaction payload, and may send to the EVM for contract code execution.

In one embodiment, when the private transaction was a transaction intended to invoke a function in a smart contract, once the node is able to retrieve the private transaction payload it processes it as normal. For example, it may invoke the smart contract execution logic via the EVM (or any other execution model).

Figure 4:
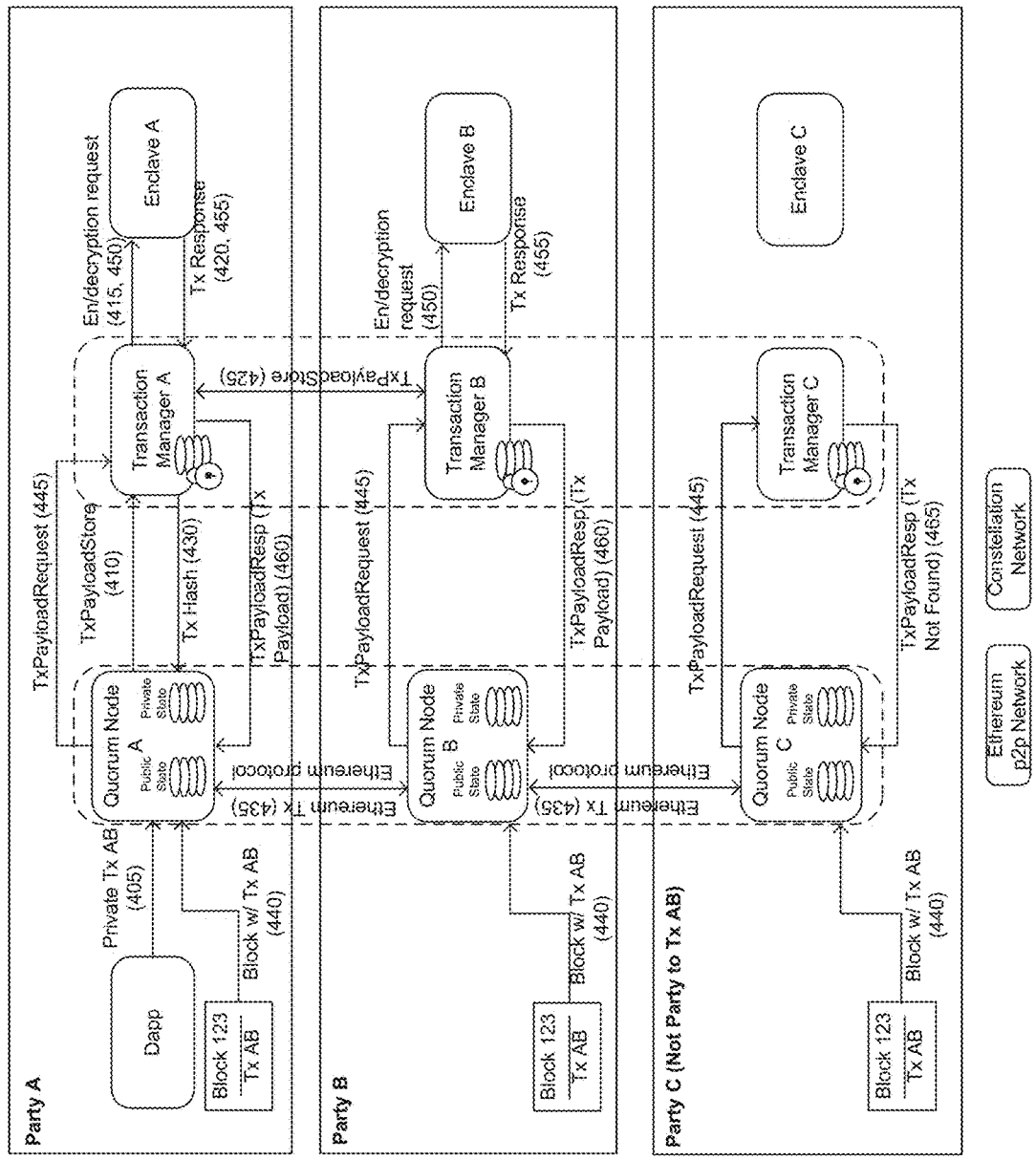
FIG. 4 depicts a block diagram of a method for providing data privacy in a private distributed ledger supporting smart contacts is disclosed according to another embodiment.

Referring to FIG. 4, a block diagram of a method for providing data privacy in a private distributed ledger supporting smart contacts is disclosed according to another embodiment. In step 405, a distributed application may prepare a transaction payload record for a private transaction between Party A and Party B to Node A.

In step 410, Node A sends the TxPayload to Transaction Manager A for storage.

In step 415, Transaction Manager A my send an encryption request to Enclave A, and, in step 420, may receive a response.

In step 425, Transaction Manager A sends encrypted TxPayloadStore to Transaction Manager B.

In step 430, Transaction Manager A sends a hash of TxPayloadStore to Node A.

In step 435, Node A sends the pending transaction with the transaction hash payload to Node B and to Node C.

In step 440, the block containing the transaction is written to the distributed ledgers In step 445, during the validation of the proposed block 123 which includes processing transaction AB, Node A sends TxPayloadRequest to Transaction Manager A, Node B sends TxPayloadRequest to Transaction Manager B, and Node C sends TxPayloadRequest to Transaction Manager C.

In step 450, Transaction Manager A and Transaction Manager B request decryption from their respective enclaves, and, in step 455, the response is received.

In step 460, Transaction Manager A and Transaction Manager B provide the TxPayload to their respective Nodes.

Notably, Party C, which is not a party to the transaction, is not in the list of the recipients, and cannot receive the encrypted payload in response to TxPayloadRequest. Thus, in step 465, it receives a notification that the transaction was not found, that the transaction is private, or any other suitable notification.

Figure 5:
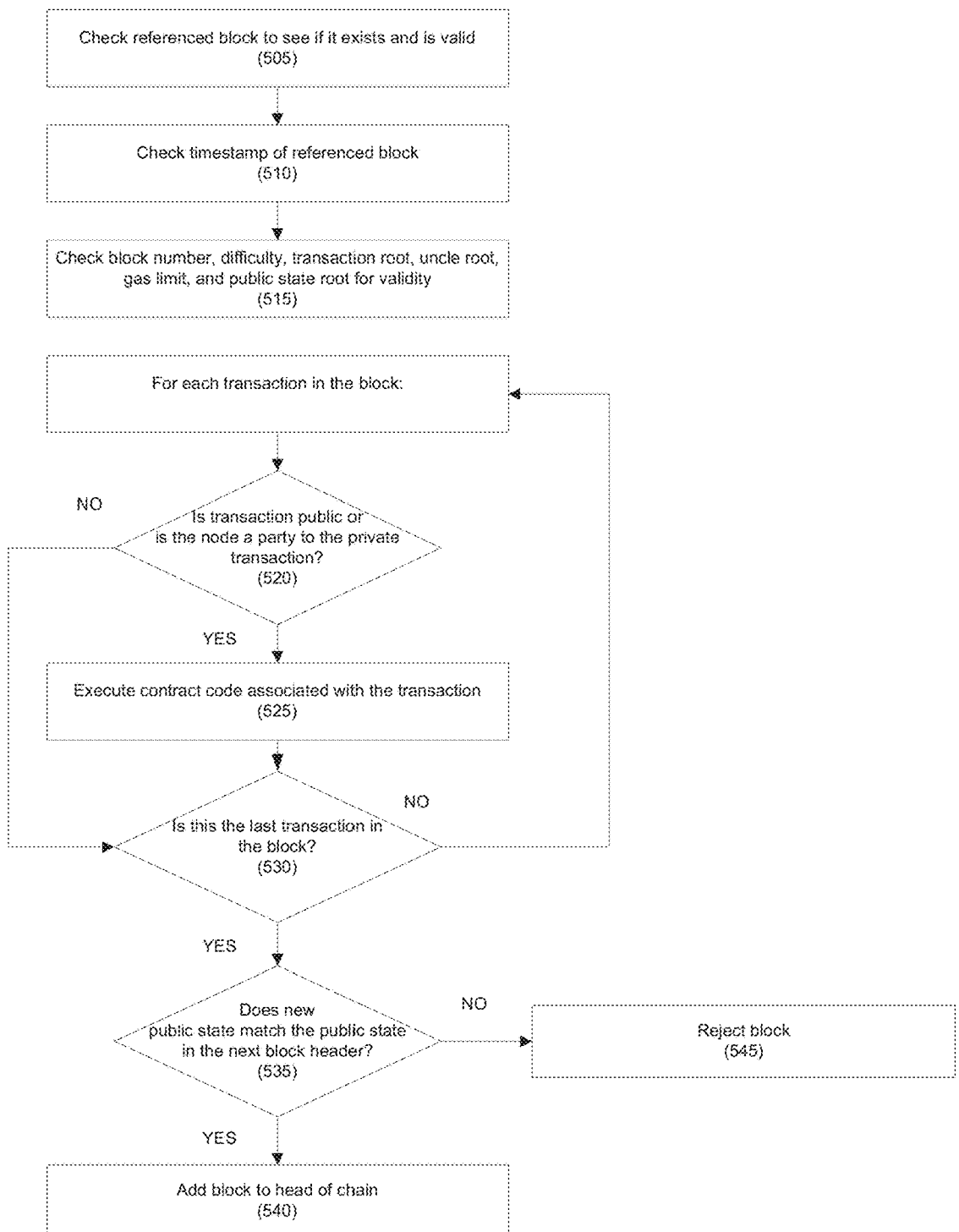
FIG. 5 depicts a block validation algorithm according to one embodiment.

Referring to FIG. 5, a block validation algorithm that includes one or more private transactions in which the validating node is not party to the private transaction(s) is disclosed according to one embodiment. In step 505, a check may be made to see if the previous block referenced exists and is valid.

In step 510, the timestamp of the current block and the referenced block may be checked. For example, the timestamp of the current block may be checked to see if it is greater than that of the referenced previous block and less than 15 minutes into the future. Other checks, timings, etc. may be used as is necessary and/or desired.

In step 515, the header may be checked for validity. For example, the block number, difficulty, transaction root, uncle root and gas limit may be checked to see if they are valid.

For each transaction in the block, in step 520, the transaction may be checked to see if it is a public transaction, or if the node is a party to the transaction. If it is not (i.e., the node is not a party to a private transaction), the process skips to step 530.

If the transaction is public or the node is a party to a private transaction, in step 525, the contract code associated with transaction may be executed. In one embodiment, the transactions may be executed as follows. Let S[0] be the public state at the end of the previous block, and let TX be the block's public transaction list, with n transactions. For all in 0 . . . n−1, set S[i+1]=Apply(S[i], TX[i]). If any applications returns an error, or if the total gas consumed in the block up until this point exceeds the GASLIMIT, return an error.

Furthermore, let S[0] be the private state at the end of the previous block, and let TX be the block's private transaction list, with n transactions. For all in 0 . . . n−1, set S[i+1]= Apply(S[i], TX[i]). If any applications returns an error, or if the total gas consumed in the block up until this point exceeds the GASLIMIT, return an error.

In step 530, a check may be made to see if the transaction is the last transaction in the block. If it is not, the process continues with step 520.

If the transaction is the last transaction in the block, in step 535, a check may be made to see if the new public state matches the public state in the next block header. If it does not, in step 545, the block is rejected. If it does, the block is added to the chain.

As a result of skipping private transactions the node is not party to, the private blockchain state database may no longer be in sync with others. This, in essence, is a ledger segmentation strategy, as the local node state is segmented into public state and private state. The public state database will be in sync with others but the private state database may no longer be in sync with others.

In addition, even though the local state database may be a subset of the whole, the blockchain is still complete and every node can participate in the peer-to-peer blockchain distribution process. The validating node is still able to check the transaction hash in the block header matches the hash it calculates through the list of transactions in the block. In addition, the validating node may be able to confirm the public state matches the public state hash digest included in the (proposed) block header.

Benefits of having one, single, all-inclusive block chain of transactions may include, for example: (1) achieving the same privacy benefits as homomorphic encryption, but without the cost; (2) through the efficient and scalable process of merkle proofs, one is able to mathematically prove/verify the state of the blockchain and every transaction contained therein including every transaction that creates every smart contract and every transaction that updates the state of every contract; (3) from this single, provable source of truth, and with access to the proper crypto keys, one is able to produce the exact state of the database at any given point in time in history. Other benefits may be realized as well.

Figure 6:
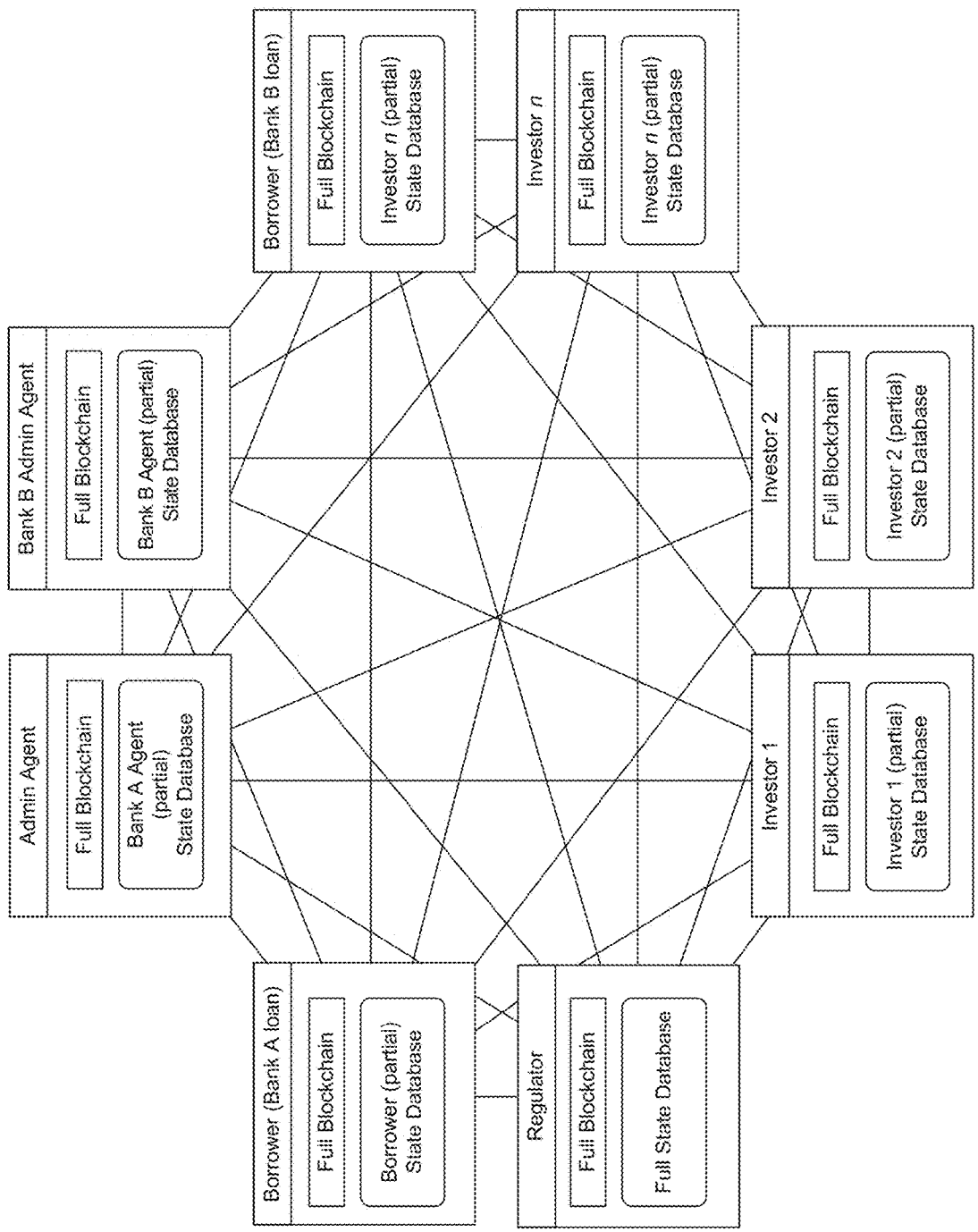
FIG. 6 depicts a system for providing data privacy in a private distributed ledger using multiple agents according to one embodiment.

In one embodiment, instead of using a single admin agent where all the loans traded on the distributed ledger are managed by a single admin agent, a multi-agent model is disclosed. An exemplary embodiment is depicted in FIG. 6. In a multi-agent embodiment, there may be no single node (other than possibly a regulator) party to all transactions and contracts. The Administrative Agent node that proposes new blocks may record the contract state hash digest with each transaction in the proposed block. If this requirement is relaxed, in one embodiment, any node may be able to propose blocks however we would lose an important step in the block validation process that allows the node's party to private transactions to easily confirm a consistent state of the corresponding private contract associated with the transaction.

In one embodiment, the Agent nodes may only include the private transactions to their private contracts (as well as public transactions) in their block proposals. Although this may alter the order of execution of (private) transactions submitted to the network, because by their nature private transactions are between the client and the Administrative Agent, the ordering of transactions involving any single Agent will be kept intact. Due to the round-robin nature of the consensus algorithm, each Administrative Agent node may have equal opportunity to execute and confirm their private transactions.

Embodiments disclosed herein may simplify the workflow and reduce the costs and settlement times associated with OTC financial assets like syndicated loans. In one embodiment, all parties to business transactions may replace their existing systems of record with the shared, distributed ledger platform. Replacing their existing systems of record removes the costs associated with maintaining those systems as well as removes the cycles of repetitive reconciliation inherent in those systems.

Embodiments disclosed herein may require some, or all, of the following: no external parties may have special "super user" privileges allowing them to independently modify the state of the system; security of the platform cannot be delegated to some "trusted" third-party; and the business logic that implements and enforces the terms of the legal contracts governing business transactions cannot be altered in any way without the provable consent of all those party to the transactions.

The following non-limiting examples are provided below.

Example 1—Syndicated Loans

Syndicated loans are particularly well-suited for a private distributed ledger (including those that support smart contracts) due to the extended settlement times resulting from manual processes and reconciliation efforts. Syndicated Loans are over the counter (OTC) assets, involving transactions that generally include an administrative agent, a borrower, a regulator, a party and a counterparty. The administrative agent and regulator functions are central to all syndicate loan activity and may be leveraged. The data privacy requirements for Syndicated Loans may include, for example: (1) the syndicated loan lender list; (2) the actual identities of the parties associated with the loan transactions; (3) the prices and sizes of trades related to the syndicated loan; and (4) the actual cash flow amounts related to loan servicing and settlement.

In one embodiment, data privacy may be achieved by using encryption and segmentation. For example, encryption may be applied to the data in transactions that everyone may view on the distributed ledger or blockchain. Segmentation may be applied to each node local state database, which may contain the contract storage and is only accessible to the node. Only nodes that are party to private transactions may be able to execute the private contract code associated with the transactions which results in updating the private contract data storage in the local state database. The result is that each node's local state database is only populated with public and private data they are party to.

Example 2—Private Transactions and Private Contracts

During the block construction and validation process, the node party to the private transaction may decrypt the transaction data prior to sending to, for example, the Ethereum Virtual Machine. The Ethereum Virtual Machine may therefore not need to support encryption/decryption operations. The private data of a private contract may be stored in the clear in the local state database but this is fine as only nodes party to the transaction will store the data. Private Contracts may be between the client and the administrative agent. a transaction according to one embodiment may contain: (1) the recipient; (2) signature identifying the sender; (3) the amount of ether; (4) an optional data field (encrypted in the case of a private transaction); (5) start gas; and (6) gas price.

Figure 7:
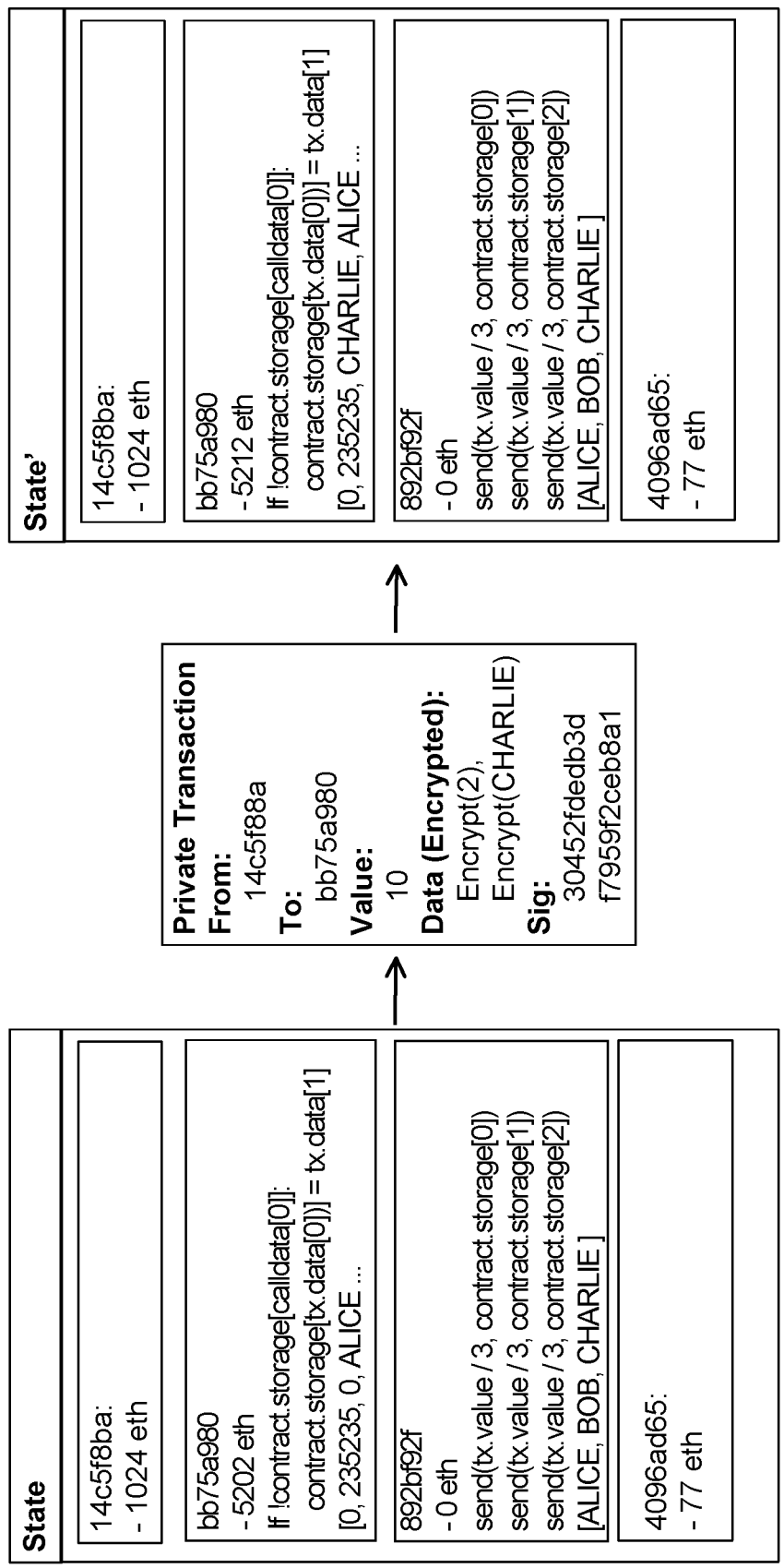
FIG. 7 depicts an exemplary diagram of a private transaction and state database according to one embodiment.

A diagram of a private transaction and state database is provided in FIG. 7.

In one embodiment, the administrative agent may provide encryption key management. For example, a number of encryption key management systems, such as nCipher, Varmetric, may be used to manage the keys. In one embodiment, the encryption key management system may make the specific encryption keys available to both the centralized GUI/application layer as well as the core node environment for decrypting private data in transactions prior to sending the transaction to the Ethereum Virtual Machine.

Example 3—Smart Contracts (Business Logic)

In one embodiment, a syndicate loan smart contract that receives the encrypted data which the end users interact with may be customized/private for the end user and the Administrative Agent. For example, if a syndicated loan involves 10 investors, there may be 10 separate (private) contracts, one for each investor. These contracts may initially be generated (programmatically) during the loan origination workflow and client on-boarding workflow operations. End users may interact with other contracts via public transactions but any private transactions may be required to be handled through their private contract. Thus, this contract may manage all the state information related to the client's position and transactions of the specific loan.

The Administrative Agent may broker all private transactions among the relevant parties. For example, the Loan Investor contract may have a function to trade, passing the parameters of the trade (price, size, counterparty, etc.) to the contract. This data may be recorded in the contract and will trigger the administrative agent to transact with the counterparty investor contract, the borrower, regulator, etc.

Figure 8:
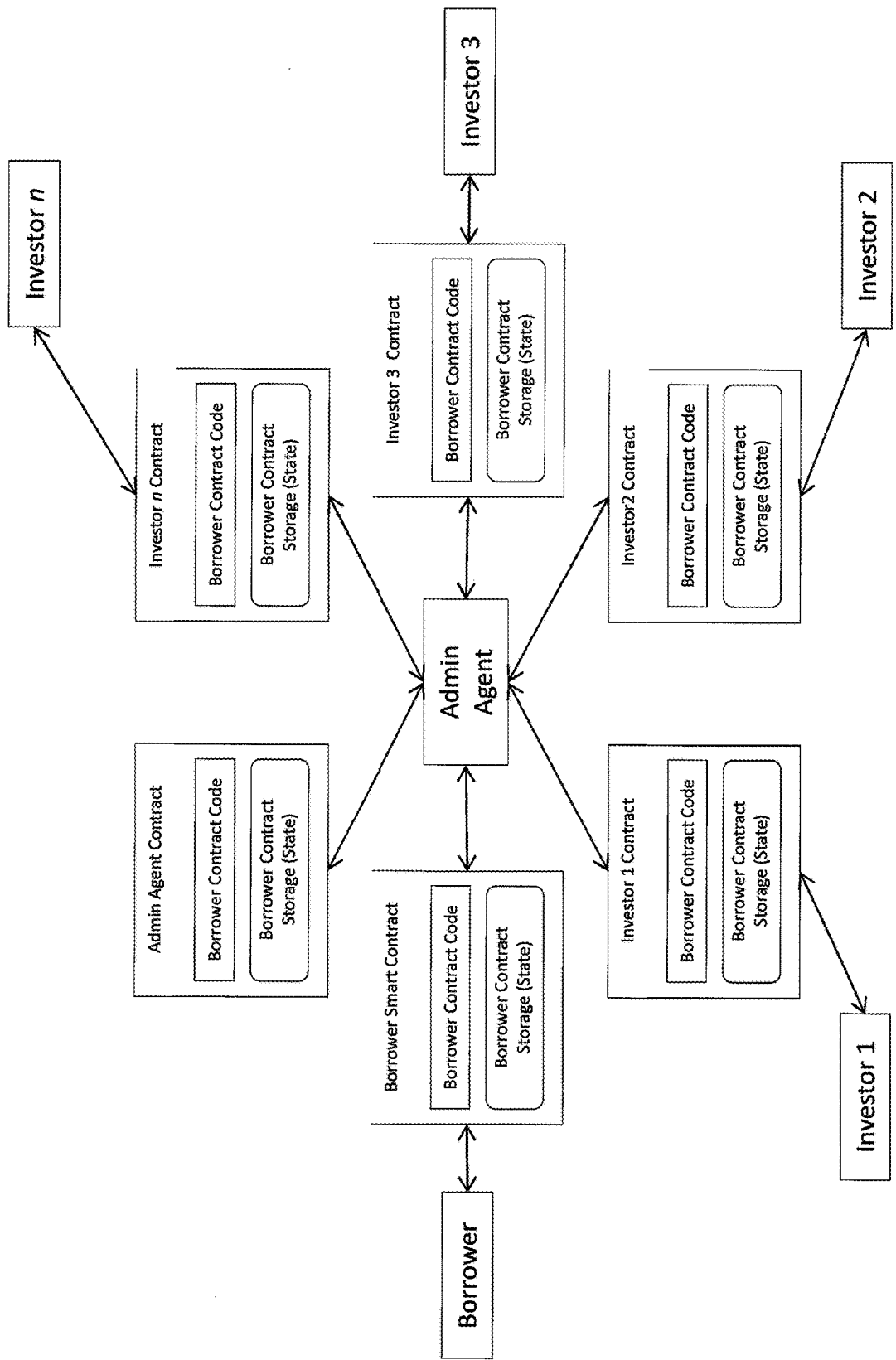
FIG. 8 depicts a syndicated loan smart contract architecture according to one embodiment.

FIG. 8 depicts a syndicated loan smart contract architecture according to one embodiment.

It should be noted that although several embodiments have been disclosed, the embodiments disclosed herein are not exclusive to one another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing data privacy in a private distributed ledger, comprising:
    a distributed application preparing a transaction payload for a private transaction;
    the distributed application sending a payload storage message comprising a hash digest, an encrypted payload, and an encrypted symmetric key to a transaction key manager;
    the transaction key manager storing the hash and the encrypted payload;
    the distributed application sending a pending transaction comprising the hash digest to one of a plurality of nodes, wherein the pending transaction is identified as private by a sentinel byte;
    one of the plurality of nodes proposing a block comprising the pending transaction to the other nodes;
    each of the plurality of nodes validating the pending transaction in the block by identifying the pending transaction as a private transaction; and
    one of the plurality of nodes sending a transaction payload request message to a transaction key manager associated with the node.

2. A method of claim 1, wherein the pending transaction is identified as private by a flag in a body of the pending transaction.

3. The method of claim 1, wherein the step of preparing a transaction payload for a private transaction comprises:
    generating the symmetric key;
    encrypting the payload with the symmetric key;
    calculating the hash digest of the encrypted payload; and
    encrypting the symmetric key with public keys of parties to the transaction.

4. The method of claim 1, wherein the transaction payload request message comprises the node's public key, the hash digest, and the node's signature.

5. The method of claim 1, further comprising:
    the transaction key manager returning a decrypted payload and encrypted symmetric key to one of the nodes in response to the node being a party to the transaction.

6. The method of claim 1, further comprising:
    the transaction key manager returning an indication to one of the nodes that the transaction is private in response to the node not being a party to the transaction.

7. A method for providing data privacy in a private distributed ledger, comprising:
    a distributed application preparing a transaction payload for a private transaction;
    the distributed application sending a payload storage message comprising a hash digest, an encrypted payload, and an encrypted symmetric key to a transaction key manager;
    the transaction key manager storing the hash and the encrypted payload;
    the distributed application sending a pending transaction comprising the hash digest to one of a plurality of nodes, wherein the pending transaction is identified as private by a flag in a body of the pending transaction;
    one of the plurality of nodes proposing a block comprising the pending transaction to the other nodes;
    each of the plurality of nodes validating the pending transaction in the block by identifying the pending transaction as a private transaction; and
    one of the plurality of nodes sending a transaction payload request message to a transaction key manager associated with the node.

8. The method of claim 7, wherein the step of preparing a transaction payload for a private transaction comprises:
    generating the symmetric key;
    encrypting the payload with the symmetric key;
    calculating the hash digest of the encrypted payload; and
    encrypting the symmetric key with public keys of parties to the transaction.

9. The method of claim 7, wherein the transaction payload request message comprises the node's public key, the hash digest, and the node's signature.

10. The method of claim 7, further comprising:
    the transaction key manager returning a decrypted payload and encrypted symmetric key to one of the nodes in response to the node being a party to the transaction.

11. The method of claim 7, further comprising:
the transaction key manager returning an indication to one of the nodes that the transaction is private in response to the node not being a party to the transaction.

* * * * *